Jan. 17, 1933.   J. G. EASTLACK   1,894,258
BUTCHER'S TOOL RACK FOR MEAT BLOCKS
Filed April 1, 1932
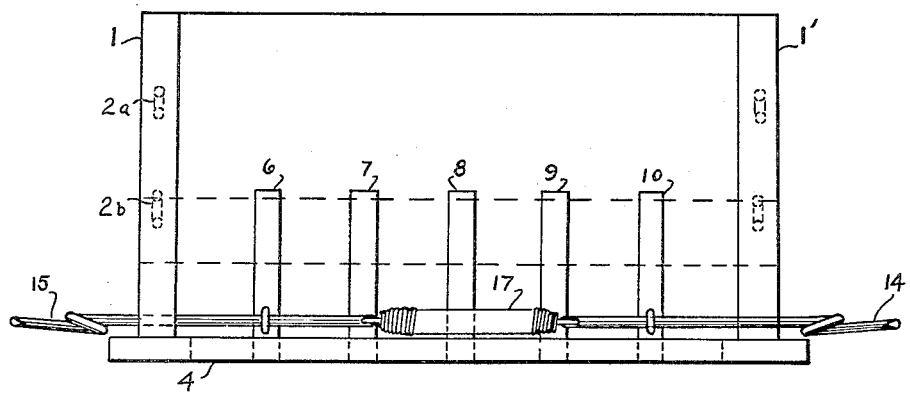
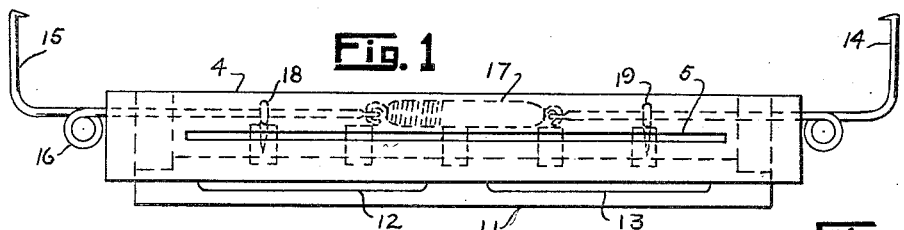
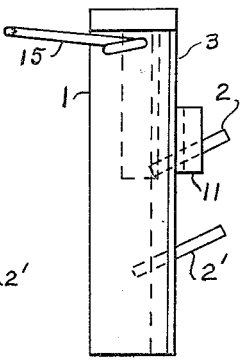
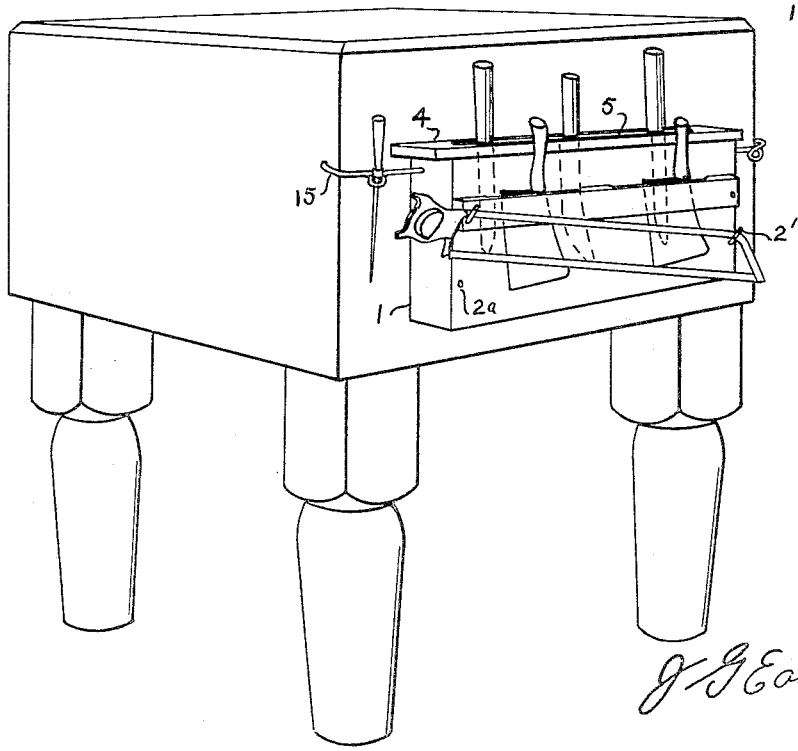
INVENTOR.
J. G. Eastlack
ATTORNEY.

Patented Jan. 17, 1933

1,894,258

UNITED STATES PATENT OFFICE

JOSEPH G. EASTLACK, OF PASADENA, CALIFORNIA

BUTCHER'S TOOL RACK FOR MEAT BLOCKS

Application filed April 1, 1932. Serial No. 602,538.

My invention relates to butchers' tool racks for use with meat blocks, and has among its salient objects: to provide a rack which can be readily adjusted and secured in place relative to a meat block in such a way that it will be steady and held in proper relation to the top and sides of such block; to provide in such a device an improved means for securing and removing the rack; to provide in connection therewith improved means for segregating the tools; to provide a device of such construction and arrangement that it will be sanitary and obstruct the operator as little as possible; and, in general, to provide an efficient tool rack of the character referred to, the parts of which can be manufactured at a minimum of expense and which is light and durable.

Minor and contributing objects will appear as the ensuing description progresses, reference being had therein to the accompanying drawing, in which—

Figure 1 is a plan view of my invention;
Figure 2 is an end view;
Figure 3 is the rear elevation;
Figure 4 is a front view showing the tool rack in position on a meat block.

I will first describe the rack proper. This is comprised of end members 1 and 1' each having holes 2a and 2b placed angularly to receive the pins 2 and 2' which provide a saw rack. These end members are secured to the front 3 as are all other parts, which are of wood, by means of dowels and glue. The top piece 4 is provided with a slot 5 into which partitions 6, 7, 8, 9, and 10 extend, thereby segregating knives or other tools deposited in the slot 5. The auxiliary front piece 11 provides slots 12 and 13 as cleaver holders. Holes 2b extending through piece 11 provide holding means for removable saw hanging pins 2 and 2'.

The clamping device comprises a pair of spring hooks 14 and 15 joined through a helical extension spring 17 in such a manner as to place tension on said hooks when inserted in the sides of a meat block. Screw eyes 18 and 19 act as guides for hooks 14 and 15. Loop 16 provides a holder for knife steels.

I do not limit my invention to the details and arrangement as shown for descriptive purposes, which are not necessarily in preferred form under all conditions and in all circumstances except as I may be limited by the hereto appended claims.

I claim:

1. In a butcher's tool rack, means for holding said rack to a butcher's meat block, said means comprising a pair of penetrating hooks for engaging opposite sides of a butcher's meat block, each of said hooks being offset angularly from a horizontal rod integral therewith, and said rods being joined by a spring capable of holding said hooks in hooked position relative to said block.

2. In a butcher's tool rack, in combination, a pair of spring actuated hooks capable of penetrating opposite sides of a butcher's meat block, horizontal arms from which said hooks project angularly and which are joined by an actuating spring, and a tool rack depending from said horizontal arms, whereby said rack by reason of the weight thereof, will rest against the side of said block.

3. In a butcher's tool rack, a holder for said rack comprising a pair of slide rods each having an angular end terminating in a hook for engaging opposite sides of a butcher's meat block, a portion of each rod being formed into a loop for holding a sharpening steel, and the pair of hooks being interconnected by a spring capable of holding the hooks in their hooked position relative to said block.

Signed at Pasadena, Los Angeles County, California, this 26th day of March 1932.

J. G. EASTLACK.